United States Patent
Wang

(10) Patent No.: US 9,515,967 B2
(45) Date of Patent: Dec. 6, 2016

(54) SYSTEMS AND METHODS FOR SHARING DATA AMONG MULTIPLE END USER DEVICES

(71) Applicant: Tencent Technology (Shenzhen) Company Limited, Shenzhen (CN)

(72) Inventor: Dong Lei Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 163 days.

(21) Appl. No.: 14/092,643

(22) Filed: Nov. 27, 2013

(65) Prior Publication Data

US 2014/0089416 A1 Mar. 27, 2014

Related U.S. Application Data

(63) Continuation of application No. PCT/CN2013/076651, filed on Jun. 3, 2013.

(30) Foreign Application Priority Data

Aug. 28, 2012 (CN) .......................... 2012 1 0309237

(51) Int. Cl.
*G06F 15/16* (2006.01)
*H04L 12/58* (2006.01)

(52) U.S. Cl.
CPC .............. *H04L 51/04* (2013.01); *H04L 51/043* (2013.01); *H04L 51/24* (2013.01); *H04L 51/36* (2013.01)

(58) Field of Classification Search
CPC ..... H04L 5/0055; H04L 51/04; G06F 15/16; G06F 12/0815; G06F 3/0659

USPC ................................. 709/205, 206; 370/249
See application file for complete search history.

(56) References Cited

U.S. PATENT DOCUMENTS 8,066,572 B1 * 11/2011 Timmons ................ H04L 67/38
273/239
8,255,469 B2 * 8/2012 Leppanen .............. G06Q 10/10
709/206

(Continued)

FOREIGN PATENT DOCUMENTS

| CN | 101252548 | 8/2008 |
| CN | 101933013 | 12/2010 |
| CN | 102075546 | 5/2011 |

OTHER PUBLICATIONS

First Office Action dated Aug. 5, 2014, directed to CN Application No. 201210309237.9, with Concise Explanation of Relevance; 12 pages.

(Continued)

*Primary Examiner* — Tesfay Yohannes
(74) *Attorney, Agent, or Firm* — Morgan, Lewis & Bockius LLP

(57) ABSTRACT

This is directed to a method of sharing data among multiple devices, the multiple devices includes a server, a source terminal, and multiple receiving terminals. The method includes: receiving, on the server, account information associated with at least one of the multiple receiving terminals, receiving, on the server, data from the source terminal to be shared with at least one of the multiple receiving terminals, determining, based on the account information, at least one active receiving terminal, alerting the at least one active receiving terminal about the data shared by the source terminal, and receiving a response from the at least one active receiving terminal indicating an action with regard to the data.

19 Claims, 7 Drawing Sheets

(56) References Cited

U.S. PATENT DOCUMENTS

| | | | |
|---|---|---|---|
| 8,406,252 B1* | 3/2013 | Wuthnow | H04N 21/235 370/466 |
| 2005/0102365 A1 | 5/2005 | Moore et al. | |
| 2007/0014243 A1* | 1/2007 | Meyer | H04L 69/24 370/249 |
| 2008/0313297 A1 | 12/2008 | Heron et al. | |
| 2009/0259349 A1* | 10/2009 | Golenski | G08G 1/205 701/2 |
| 2010/0040217 A1* | 2/2010 | Aberg | H04L 12/1822 379/202.01 |
| 2011/0047075 A1* | 2/2011 | Fourez | G06Q 20/32 705/44 |
| 2012/1014397 | 6/2012 | Zhang et al. | |
| 2012/0231880 A1* | 9/2012 | Sakai | A63F 13/77 463/29 |
| 2012/0290476 A1* | 11/2012 | Yoo | G06Q 20/10 705/42 |
| 2013/0018791 A1* | 1/2013 | Mendicino | G06Q 20/4016 705/44 |

OTHER PUBLICATIONS

First Examination Report dated May 13, 2015, directed to NZ Application No. 627640; 2 pages.

International Search Report and Written Opinion mailed Sep. 19, 2013, directed to International Application No. PCT/CN2013/076651; 11 pages.

Office Action dated Dec. 8, 2015, directed to CA Application No. 2,862,876; 5 pages.

Office Action dated Jul. 16, 2015, directed towards counterpart MX Application No. 2014010229; 3 pages with concise explanation of relevancy.

Office Action dated Feb. 9, 2016, directed towards Chilean Application No. 2014-002315; 10 pages with English translation.

Tencent Technology, IPRP, PCT/CN2013/076651, Mar. 3, 2015, 6 pgs.

* cited by examiner

SYSTEMS AND METHODS FOR SHARING DATA AMONG MULTIPLE END USER DEVICES

CROSS REFERENCE TO RELATED APPLICATIONS

This application is a U.S. continuation application under 35 U.S.C. §111(a) claiming priority, under 35 U.S.C. §120 and 365(c), to International Application No. PCT/CN2013/076651 filed on Jun. 3, 2013, which claims the priority benefit of Chinese Patent Application No. 201210309237.9, filed Aug. 28, 2012, the contents of both the PCT application and the Chinese application are incorporated by reference herein in their entirety for all purposes.

FIELD

The present disclosure relates to communications among multiple devices, and more particularly, to a messaging system for facilitating real-time data sharing among multiple end user devices.

BACKGROUND

As the popularity and varieties of electronic devices continue to grow, it is not unusual for a person to have multiple devices at his disposal. For example, a person may have a personal computer (PC) and a tablet PC at home, a laptop for work, and a smartphone as his mobile device. With all these devices, there is often a need to transfer data, such as images, documents, and video clips, from one device to another device. For example, the person may want to view a video clip recorded on his smartphone on his PC. Similarly, the person may also want to share the video dip with his friends, which would require him to send the clip to his friends' devices. Thus, there is a great need for an efficient and intuitive way of sharing data among multiple devices.

Point-to-point communication mechanisms such as instant messaging (IM) have been around for a while. Existing IM applications, for example, provide a quick and convenient way for the users to communicate with each other and transfer data from one device to another device in real time. Typically, a first user logs into his account and uses the IM application on his device to send a message to a second user's account. The second user can log into his account on one of his devices and view the message without much delay. The message can include different types of data, such as text, image, and video/audio data. Depending on the type of the data being transmitted, the IM application may support one or more of the existing formats including, for example, text message, Short Message Service (SMS), Multimedia Messaging Service (MMS), Video Messaging Service (VMS), etc.

However, there are a number of shortcomings of existing IM applications. For example, none offers its users the options of choosing when and/or on which device to receive incoming messages and data. Typically, the recipient receives the incoming message within a short period of time after the message was sent by the sender and the message is only received on the device being used by the recipient at the time of the message's arrival. This may be inconvenient for the user if, for example, a video clip is received on the recipient's mobile phone, but he would prefer to view it on his tablet PC instead. At the minimum, an additional step is required to transfer the video clip from the mobile phone to the tablet PC. This may require logging on to another device and opening up another messaging interface to download the video again, which can cause further delay and inconvenience for the user. Similarly, the recipient typically cannot delay the arrival of a message when online. This may be an issue when, for example, the recipient is working on a public PC in plain view of other people and would rather not have incoming messages displayed on the screen as they arrive. With current IM applications, he may have no choice but to turn the IM application off. In addition, if a message is deleted after being received on the recipient's device, there is no easy way to recover the message. For example, if the recipient wishes to watch the video in the deleted message again, he may have to ask the sender to resend the video.

It is, thus, desirable to have more efficient and user friendly account-based systems and methods for sharing data among multiple end user devices.

SUMMARY

The disclosed systems and methods can provide real time or delayed transfer of data among multiple devices. In some embodiments, the disclosed systems and methods can provide the recipient with an option to designate one or more receiving terminals for receiving data from another user. In some embodiments, an intermediate storage system can be provided for storing shared data temporarily or permanently before and/or after the data is retrieved by the one or more receiving terminals. This allows the recipients to retrieve the shared data at any time and for as many times as they desire. This data storage system can also serve as a data repository and/or backup system for the users. The disclosed systems and methods can utilize existing user account information for one or more applications and/or devices as means for validating user identity and tracking shared data by user. In some embodiments, all users can use account information for a single application (e.g., a messaging application) to share data. In other embodiments, users can user account information associated with different applications for the same purpose as long as the system can track multiple user accounts of the same user.

One aspect of the disclosure is directed to a method of sharing data among multiple devices, the multiple devices including a server, a source terminal, and multiple receiving terminals. In one embodiment, the method includes receiving, on the server, account information associated with at least one of the multiple receiving terminals, receiving, on the server, data from the source terminal to be shared with at least one of the multiple receiving terminals, determining, based on the account information, at least one active receiving terminal, alerting the at least one active receiving terminal about the data shared by the source terminal, and receiving a response from the at least one active receiving terminal indicating an action with regard to the data.

In some embodiments, the response is to accept the data on one or more of the receiving terminals.

In some embodiments, the method can also include transmitting a list of active receiving terminals to the at least one active receiving terminal, and receiving, from the receiving terminal, a selection of one or more of the active receiving terminals to receive the data.

In some embodiments, the method can also include transmitting the data to the one or more selected active receiving terminals.

In some embodiments, the response includes a request to store the data on the server. In some embodiments, the method also includes storing the data on the server based on the account information.

In some embodiments, the method also includes receiving, from one of the source terminal or receiving terminals, a request to retrieve stored data from the server based on a user account, identifying all data and corresponding identification information associated with the user account, transmitting the identification information to the requesting terminal, receiving a selection of the identification information from the requesting terminal, transmitting data identified by the identification information to the requesting terminal.

In some embodiments, the method can also include checking whether the data is already stored on the server, and if the data is already existed on the server, prompting the user whether to overwrite the existing data or cancel the request for storing the data from the source terminal.

In some embodiments, the response includes rejecting the data.

In some embodiments, determining the active terminals includes: determining one or more of the receiving terminals on which the account information indicating an online status, wherein the one or more receiving terminals are identified by their respective IP address or associated telephone number.

In some embodiments, determining the active terminals includes determining one or more of the receiving terminals to which the account information has ever been associated.

In some embodiments, the account information is also associated with the source terminal.

In some embodiments, the method also includes limiting the availability of the data to a certain period of time or based on a geographic location of at least one of the receiving devices.

In some embodiments, the account information is associated with a messaging application or includes a recipient's address.

Another aspect of the disclosure is directed to a non-transitory computer-readable storage medium of a server connected to a source terminal and multiple receiving terminals, the storage medium storing instructions. In one embodiment, the stored instructions when executed by a processor, perform the steps of: receiving account information associated with at least one of the multiple receiving terminals, receiving data from the source terminal to be shared with at least one of the multiple receiving terminals, determining, based on the account information, at least one active receiving terminal, alerting the at least one active receiving terminal about the data shared by the source terminal, and receiving a response from the at least one active receiving terminal indicating an action with regard to the data.

Another aspect of the disclosure is directed to a server in communication with a source terminal and multiple receiving terminals, the server configured to facilitate data sharing between the source terminal and at least one of the multiple receiving terminals. In one embodiment, the server includes a receiving module that receives data to be shared by the source terminal using user account information obtained from the source terminal, a transmitting module that transmits an alert to the at least one of the multiple receiving terminals in response to the receiving module receiving the shared data, and a processing module that stores the shared data based on the user account information in response to a request from the receiving terminal.

In some embodiments, the processing module transmits the stored data to the at least one receiving terminal in response to the receiving module receiving a request for delivery of the stored data from the receiving terminal.

Another aspect of the disclosure is directed to a terminal connected to a server and at least one other terminal over a network. In one embodiment, the terminal includes: a data transfer module that transmits outbound data to the server to be shared with the at least one other terminal, a data storage request module that requests the server to store inbound data shared by the at least one other device, a transmitting module that requests a delivery of data stored on the server using user account information, and a receiving module that receives identification information of all data available on the server and associated with the user account information.

In some embodiments, the transmitting module selects identification information of the data to be downloaded from the server and transmit the selected identification information to the server.

In some embodiments, the receiving module receives shared data identified by the selected identification information.

In some embodiments, the user account information includes one of an account number, username, and a phone number.

In some embodiments, each of the data transfer module, data storage request module, transmitting module, and receiving module is in communication with one or more of the other modules.

DETAILED DESCRIPTION

In the following description of preferred embodiments, reference is made to the accompanying drawings which form a part hereof, and in which it is shown by way of illustration specific embodiments in which the disclosure can be practiced. It is to be understood that other embodiments can be used and structural changes can be made without departing from the scope of the embodiments of this disclosure.

This generally relates to systems and methods for sharing data among multiple end user devices using a common user account system. As referred hereinafter, end user devices can be any electronic device capable of connecting to a network for transmitting and receiving data. Such devices can include, but are not limited to, PCs, Macs, desktop computers, laptop computers, tablet PCs, smartphones including iPhones, Android phones, Windows phones, and Blackberries, e-readers, in-car communication devices, televisions and other consumer electronic devices with sufficient network capabilities. Furthermore, the end user devices can also be referred to as terminals (i.e., "device" and "terminal" are interchangeable terminologies). For example, the end user device from which data is being shared can be referred to as a source terminal, and the end user device receiving the shared data can be referred to as a receiving terminal. A terminal can be both a source terminal and a receiving terminal in various embodiments of the disclosure. A source terminal and a receiving terminal can be devices belonging to the same user or different users. As referred hereinafter, the types of data shared by the devices/terminals can include, but is not limited to, text, image, video, audio, and other types of multimedia data.

The disclosed systems and methods can provide real time or delayed transfer of data among multiple devices. In some embodiments, the disclosed systems and methods can provide the recipient with an option to designate one or more receiving terminals for receiving data from another user. In some embodiments, an intermediate storage system can be provided for storing shared data temporarily or permanently before and/or after the data is retrieved by the one or more receiving terminals. This allows the recipients to retrieve the shared data at any time and for as many times as they desire. This data storage system can also serve as a data repository and/or backup system for the users. The disclosed systems and methods can utilize existing user account information for one or more applications and/or devices as means for validating user identity and tracking shared data by user. In some embodiments, all users can use account information for a single application (e.g., a messaging application) to share data. In other embodiments, users can user account information associated with different applications for the same purpose as long as the system can track multiple user accounts of the same user.

Figure 1:
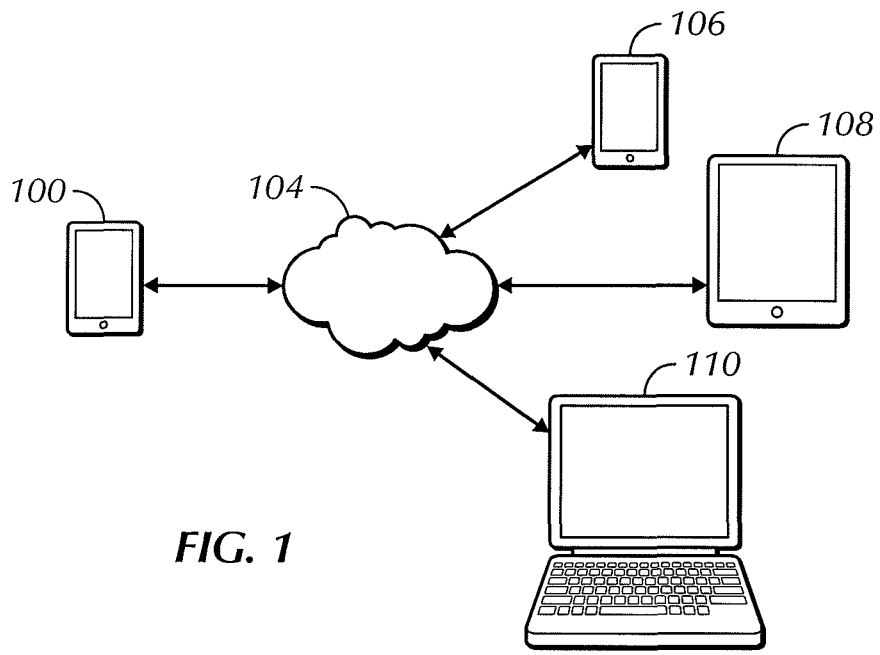
FIG. 1 is a block diagram illustrating multiple end user devices connected to a network for sharing data, according to embodiments of the disclosure.

FIG. 1 illustrates an exemplary system of the present disclosure that can provide improved user experience with regard to data sharing and resolve the issues existing in the current point-to-point IM systems. As illustrated in FIG. 1, devices 100, 106, 108, 110 can be connected to a server 104 via a network. Although each of these devices 100, 106, 108, 110 is illustrated as different types of end user devices such as smartphones, tablet PC, and laptop computer, it should be understood that each of these devices 100, 106, 108, 110 can be of any type of end user device capable of communicating over the network. Each device can both transmit and receive data over the network.

In this embodiment, device 100 can be a source terminal from which data can be shared with the other devices 106, 108, 110. Devices 106, 108, 110 can be receiving terminals for receiving data shared by device 100. All four illustrated devices 100, 106, 108, 110 can belong to the same user or different users. In one embodiment, device 100 can be User A's device and devices 106, 108, 110 can be User B's devices. Although four devices are illustrated, it should be understood that any number of devices can connect to the server 104 and the features and operations described below with reference to this figure can easily be applicable to a different number of devices without changing the basic concept of the embodiment. In one embodiment, each device 100, 106, 108, 110 can have installed on it a messaging application for communicating with the other devices. Other types of communication applications can be used in other embodiments. The messaging application can be an IM application such as MSN or Yahoo! messenger. The messaging application may require a user account for a user to send and receive messages and other data. The user account can be an account created for the particular application. Alternatively, it can also be an account for the particular device as long as that the account can be validated by the server for the purpose of sharing data among the devices. The usage of account information for identifying a user and associating shared data with a particular user are discussed in detail in the embodiments below.

The server 104 can be connected to devices 100, 106, 108, 110 via a network and capable of transmitting and receiving data from each device 100, 106, 108, 110. In one embodiment, the server can communicate with different types of devices and/or devices running different operating systems (e.g., iOS and Android). The server 104 can also serve as a remote storage for storing data received from one or more of devices 100, 106, 108, 110. In some embodiments, the server 104 can be a cloud server. The cloud server can be accessed using the same user account for the messaging application from the end user devices. A user having a valid account can be allocated a certain amount of memory space on the cloud server for storing his data. The amount of memory space assigned to each user can be limited or unlimited. In some embodiments, the user may have the option of paying for additional memory space if the allocated space is limited. Data stored on the server can be managed by any suitable means. For example, each user may have a "My Documents" folder on the cloud server. The "My Documents" folder can be linked to the user's message application account and accessed using the same login information such as username and password. Data stored in the "My Documents" folder can be grouped into different categories by, for example, data type (e.g., text, image, and video), size of the data, and/or assigned security levels (e.g., public, private).

The network connecting the devices 100, 106, 108, 110 and the server 104 can be any wireless or wired networks, including but not limited to the Internet, local area network (LAN), wide area network (WAN), cellular network, Wi-Fi network, and virtual private network (VPN).

Figure 2:
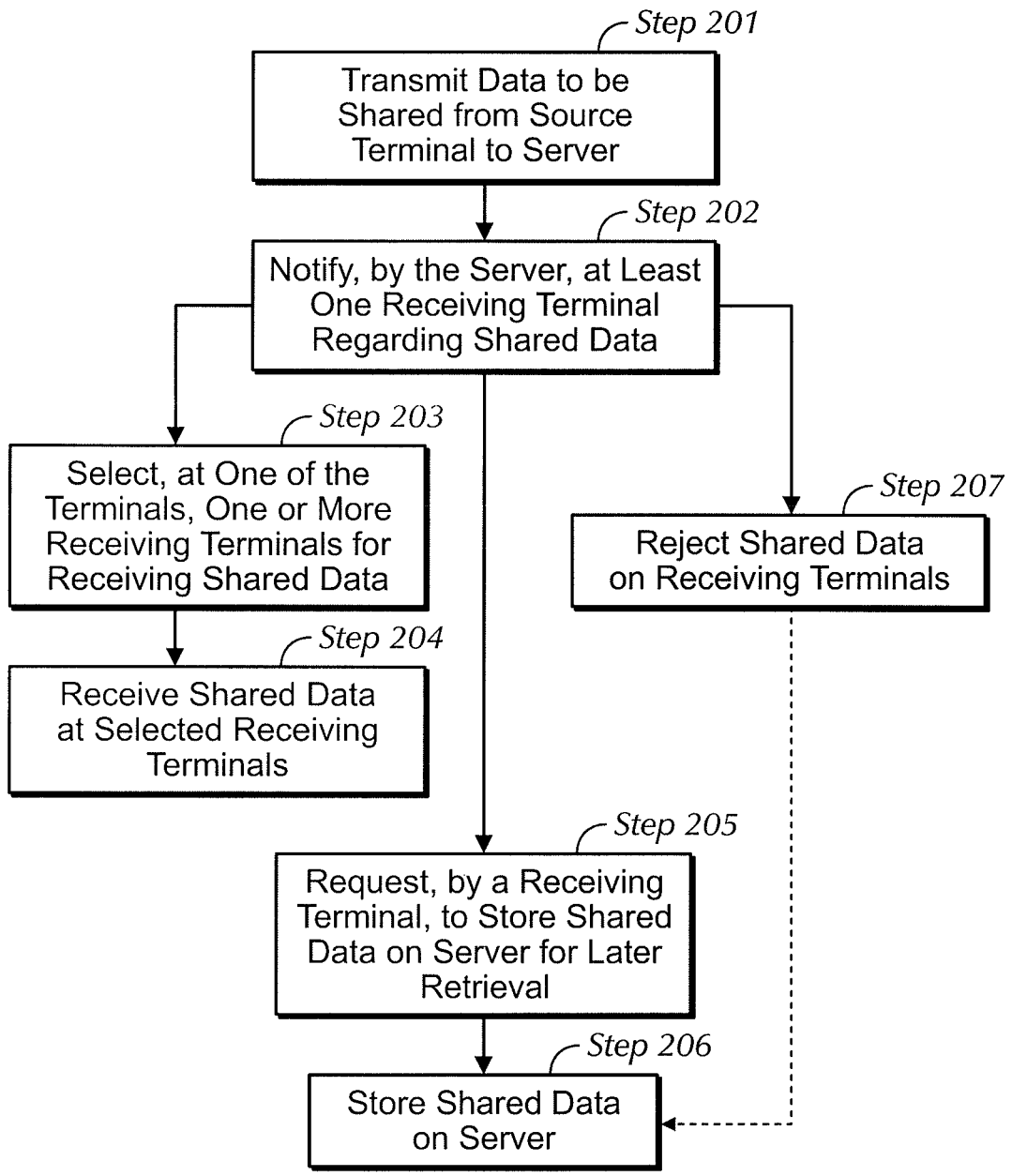
FIG. 2 is a flow chart illustrating exemplary steps in a data sharing process among multiple end user devices (terminals), according to embodiments of the disclosure.

FIG. 2 is a flow chart illustrating the exemplary steps of a data sharing process among devices 100, 106, 108, 110, according to one embodiment of the disclosure. First, User A can log into the messaging application on source terminal 100 using his account information (e.g., username and password) and designate data from the source terminal 100 to transmitted to the server 104 to be shared with User B, who can be identified by his account number or username (Step 201). It should be understood that the same process described in view of FIG. 2 can be used for sharing data among User A's own devices. After the server 104 receives the data from source terminal 100, it can send an alert to one or more of devices 106, 108, 110, notifying User B that User A has offered to share his data (Step 202). In one embodiment, the server 104 can detect whether User B has logged into his account at the moment and the devices on which he has logged in. This can be done by tracking identifiers, such as IP address and phone number, associated with each terminal from which User B's login information has been captured. In one embodiment, the server can compile of a list of devices (i.e., active devices or terminals) on which User B is currently logged into his messaging application account. The list may be a list of IP addresses, phone numbers, or other identifiers of the active devices. The server can then send the alert to the active devices based on information (e.g., IP addresses, phone numbers) in the complied list. In one embodiment, the alert can be sent as a message via the messaging application to User B' account. In one embodiment, the account information associated with the receiving terminal can be of the same application as that of the account from which data was sent on the source terminal. For example, User A can send the data using his MSN account and User B can receive the alert and/or the data also using his MSN account.

The alert from the server can also provide one or more options for User B to choose with regard to how User B would like to proceed with this newly-shared data from User A. For example, User B may choose to accept the shared data on one or more of his devices 106, 108, 110. In one embodiment, the server can generate a list of User B's active devices, i.e., devices from which he has signed into his messaging application account. This list of devices can include, for example devices 106, 108, 110 of FIG. 1, if User B has signed in on all three devices. The list of active devices can be presented to User B, either as a part of the alert or after separate from the alert. User B can then select, from one of the receiving terminals, one or more of the active devices 106, 108, 110 for receiving the shared data from User A (Step 203). Thereafter, the shared data can be transmitted from the server 104 and received on the selected devices (Step 204). Alternatively, the active list of User B's devices can be generated or pre-stored on one or more of User B's devices and activated by the alert from the server 104. Alternatively, the list can include not only active devices, but also all of User B's devices including the devices on which he has yet to log into the messaging application.

By allowing the recipient (e.g., User B) to select the devices for receiving the data shared from the source terminal, it can be ensured that the recipient can receive the data on one or more devices of his choice. That is, the recipient does not have to receive the data on one device and then forward the data to his other devices. In fact, the shared data can be delivered to all of the recipient's devices so that there is no longer a need to take the additional steps of forwarding the data among the devices. This can significantly improve the data sharing experience, at least on the recipient's side.

Referring back to FIG. 2, as an alternative to accepting the shared data, if User B does not wish to have the shared data delivered to any of his devices 106, 108, 110 when he receives the alert, he can request that the shared data be stored for possible retrieval at a later time (Step 205). This request can be made from one of the receiving terminals. In the illustrated embodiment, User B can request that the shared data be stored in a storage space on the server 104 (Step 206). Additionally or alternatively, User B can save the shared data as a file locally on his device (not shown in FIG. 2). The process of storing shared data on server 104 is discussed in more detail below in view of FIG. 4. This option can allow the recipient of the shared data to retrieve the data at his convenience at a later time.

In one embodiment, User B can set a specific time for receiving the shared data. Additionally or alternatively, User B can be required to retrieve the data within a certain period of time (e.g., within 24 hours) after receiving the alert. The data may become unavailable after the period of time passes. Additionally or alternatively, the shared data can only be retrieved when User B is within a certain geographical area (e.g., in New York City). User B's location can be determined using the GPS capability of his device. In various embodiments, the above-described time and/or location-based limitations associated with data retrieval can be set by either User A (i.e., the user who shares the data) or User B (i.e., the user who receives the shared data).

Additionally or alternatively, if User B does not wish to receive this shared data from User A after being receiving the alert from the server, User B can choose to reject the data by, for example, selecting the corresponding option from one of his devices 106, 108, 110 (Step 207). In one embodiment, if User B does not choose to accept the shared data or request the data be stored on the server within a predetermined prior of time (e.g., 24 hours), the shared data can be rejected automatically. In another embodiment, the shared data can be automatically stored on the server, even if it is rejected by User B (Step 206).

Figure 3A:
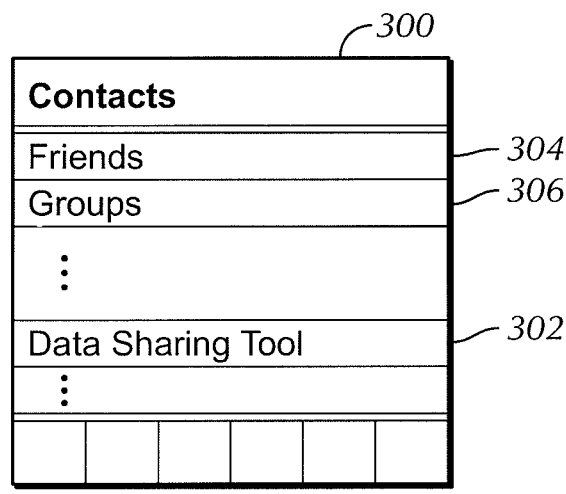
FIGS. 3a-3d are exemplary user interfaces of a messaging application on the source terminal, according to embodiments of the present disclosure.

FIGS. 3a-3d are exemplary user interfaces of the messaging application on the source terminal (e.g., User A's device 100) for sending data to be shared on one or more receiving terminals (e.g., User B's devices 106, 108, 110). FIG. 3a illustrates an exemplary "Contacts" screen 300 on a source terminal (e.g., device 100 in FIG. 1). The "Contacts" screen 300 can be activated after the user logs into his messaging application account. The "Contacts" screen 300 can include a list of options such as "Friends" 304 and "Groups" for accessing the user's contact directory. In this embodiment, the "Contacts" screen 300 can also include a "Data Sharing Tool" option 302, which can be selected by the user to manage and share his data.

Figure 3B:
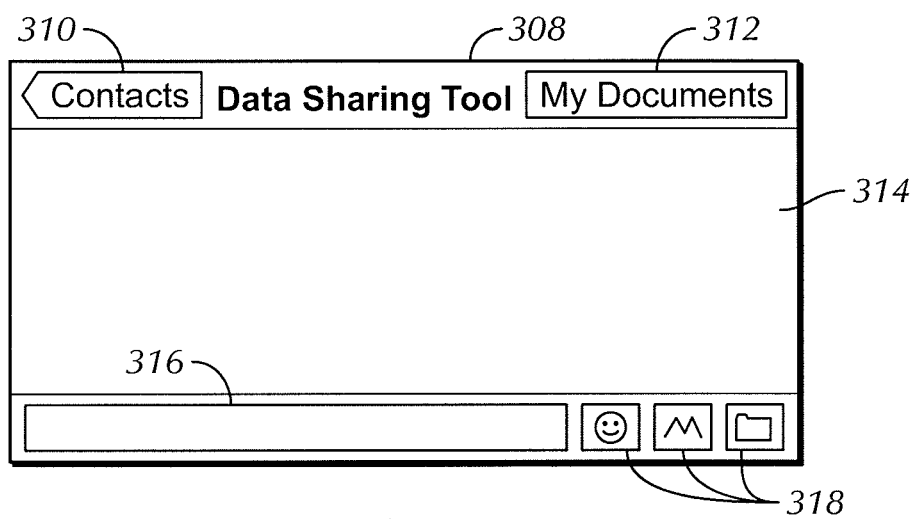

After the user selects the "Data Sharing Tool" 302 from the "Contacts" screen 300, a "Data Sharing Tool" screen 308 can be displayed on the source terminal. As illustrated in FIG. 3b, the "Data Sharing Tool" screen 308 can include a "Contacts" button 310 for returning to the "Contacts" screen 300. It can also include a "My Documents" button 312 for accessing the particular user's collection of data including, but not limited to his documents, pictured, videos, music stored in the "My Documents" folder on the server. The "Data Sharing Tool" screen 308 can also include, for example, a display area 314 for displaying communications sent and received from the messaging application, a text box 316 for entering text communication, and other selectable options 318 common to a messaging application. To share data with other devices, the user can select data from a source on his device (i.e., the source terminal). For example, the user can select a picture from the device's Photo application or a text document from the document editing application. This can be done by selecting a corresponding selectable option 318 to open the source application and then select the image/document to be shared. Additionally or alternatively, the user can also select the "My Documents" button 312 to browse the data stored in the "My Documents" folder on the server. "My Documents" folder can be a remote repository of the user's data. This remote repository can be any type of storage space on a remote server (e.g., server 104 in FIG. 1) such as a cloud server.

Figure 3C:
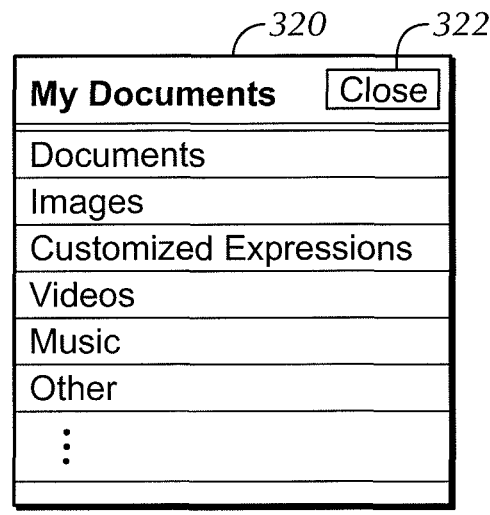

An exemplary "My Documents" screen is illustrated in FIG. 3c. In the illustrated example, the user's documents can be grouped by their types, such as documents, images, customized expressions, videos, music, and other. It should be understood that the grouping of the documents can be optional. It should also be understood that the documents can be grouped, categorized, arranged, and/or presented differently, in any way suitable for browsing, searching, and/or selecting by the user. The user can select one or more documents from the one or more displayed groups to be shared with other devices. A "Close" button 322 can be provided to exit the "My Documents" screen 320.

Figure 3D:
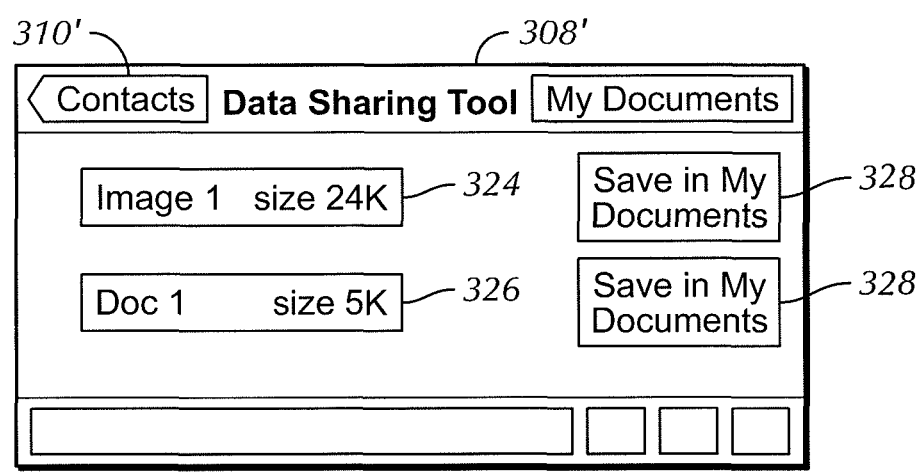

After the user selects documents to be shared from his device and/or "My Documents" 320, the message application can return to the "Data Sharing Tool" screen. As illustrated in FIG. 3d, the display area 314 of the "Data Sharing Tool" screen 308' can now be populated with one or more selected documents 324, 326 to be shared through the messaging application. Optionally, the size of each of the selected documents 324, 326 can be displayed next to the document. In addition, a "Save in My Docs" button 328 can be provided to allow the user to save each document in the remote "My Documents" repository. From this screen, the user can press, for example, either "send" or "enter" to transmit the selected documents to a server (e.g., server 104) to be shared with one or more receiving terminals (e.g., 106, 108, 110). In one embodiment, after the selected documents are received by the receiving terminal(s), the source terminal can receive a receipt confirmation from the server or the receiving terminal(s).

Figure 3E:
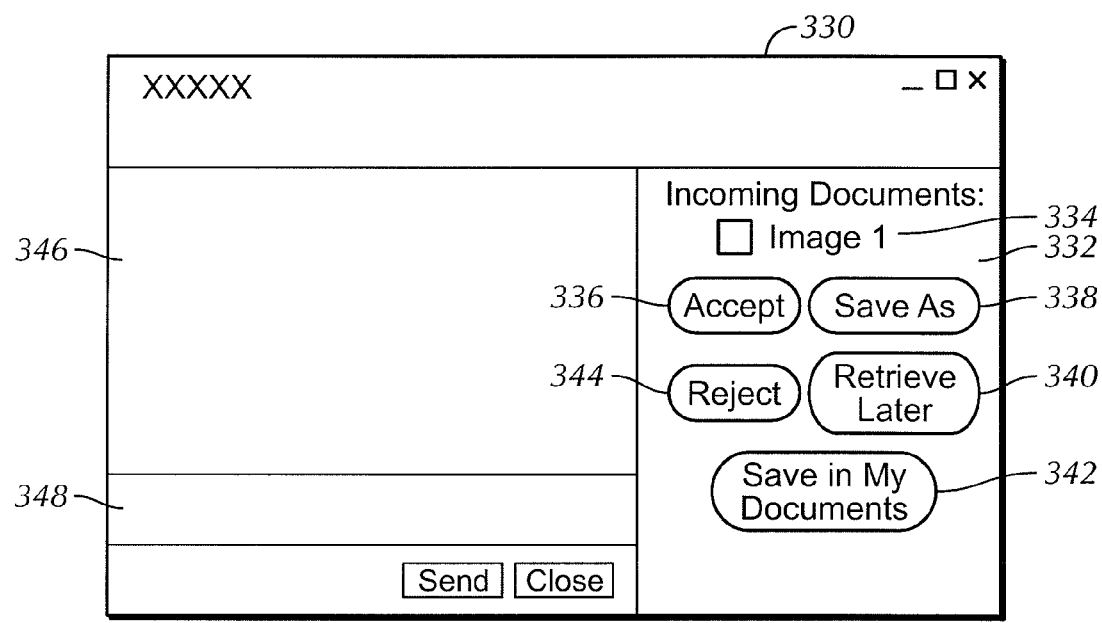
FIGS. 3e and 3f are exemplary user interfaces on the receiving terminal for receiving incoming shared data from the server, according to embodiments of the present disclosure.
Figure 3F:
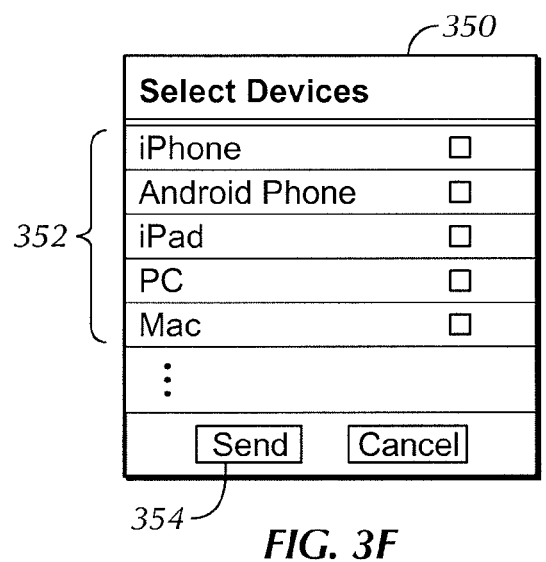

FIGS. 3e and 3f illustrate exemplary user interfaces on the receiving terminal for receiving incoming shared data from the server. In the screen of FIG. 3e, a portion of the screen 332 can be allocated for displaying the alert of incoming documents. For example, the name of the one or more incoming documents (e.g., "Image 1") can be displayed in this portion of the screen 332. In addition, other information relevant to the incoming documents, such as their sizes and senders, can also be displayed on the screen (not shown in FIG. 3e). As illustrated in FIG. 3e, one or more options 336, 338, 340, 342, 344 can be provided to the recipient with regard to how the proceed in response to the alert. For example, the recipient can accept the incoming documents by selecting "Accept" 336, reject the incoming documents by selecting "Reject" 244, saving the documents locally by selecting "Save As" 338, saving the documents in the remote storage "My Documents" by selecting "Save in My Documents" 342, or simply choosing to retrieve the documents at a later time by selecting "Retrieve Later 340, in which case, the documents may also be stored on the server. The screen 330 can also include a portion 346 for displaying incoming and outgoing messages on the receiving terminal and another portion 348 for entering text messages. In other embodiments, the alert portion 332 can be displayed in a separate window, such as a popup window, on the screen. If the recipient is logged into the message application on multiple devices, the same user interface 330 and/or alert can be displayed on all of these devices.

When the recipient (e.g., User B) chooses to accept the shared data by selecting "Accept" 336, a screen listing one or more of his active devices can be displayed to allow him to choose the devices (receiving terminals) to which the data is to be delivered. An exemplary "Select Device" screen in shown in FIG. 3f. As illustrated, a list of available devices 352 can be displayed on the screen 352. The devices can include any type of network-enabled device, such as iPhone, Android Phone, iPad, PC, and Mac. They can all belong to a single user (e.g., User B) or, in some embodiments, different users sharing the same account. In one embodiment, the list can include all devices on which User B has logged into his messaging application. In another embodiment, the list can include all of User B's devices currently online. In yet another embodiment, the list can include all of User B's devices regardless of whether they are currently online or offline. In yet another embodiment, the list can also include devices of other users such as the sender's (e.g., User A) devices. User B can select one or more of the devices in the list by, for example, checking the corresponding checkboxes next to the devices and click on the "Send" button 354 to accept the shared data on these selected devices.

Figure 4:
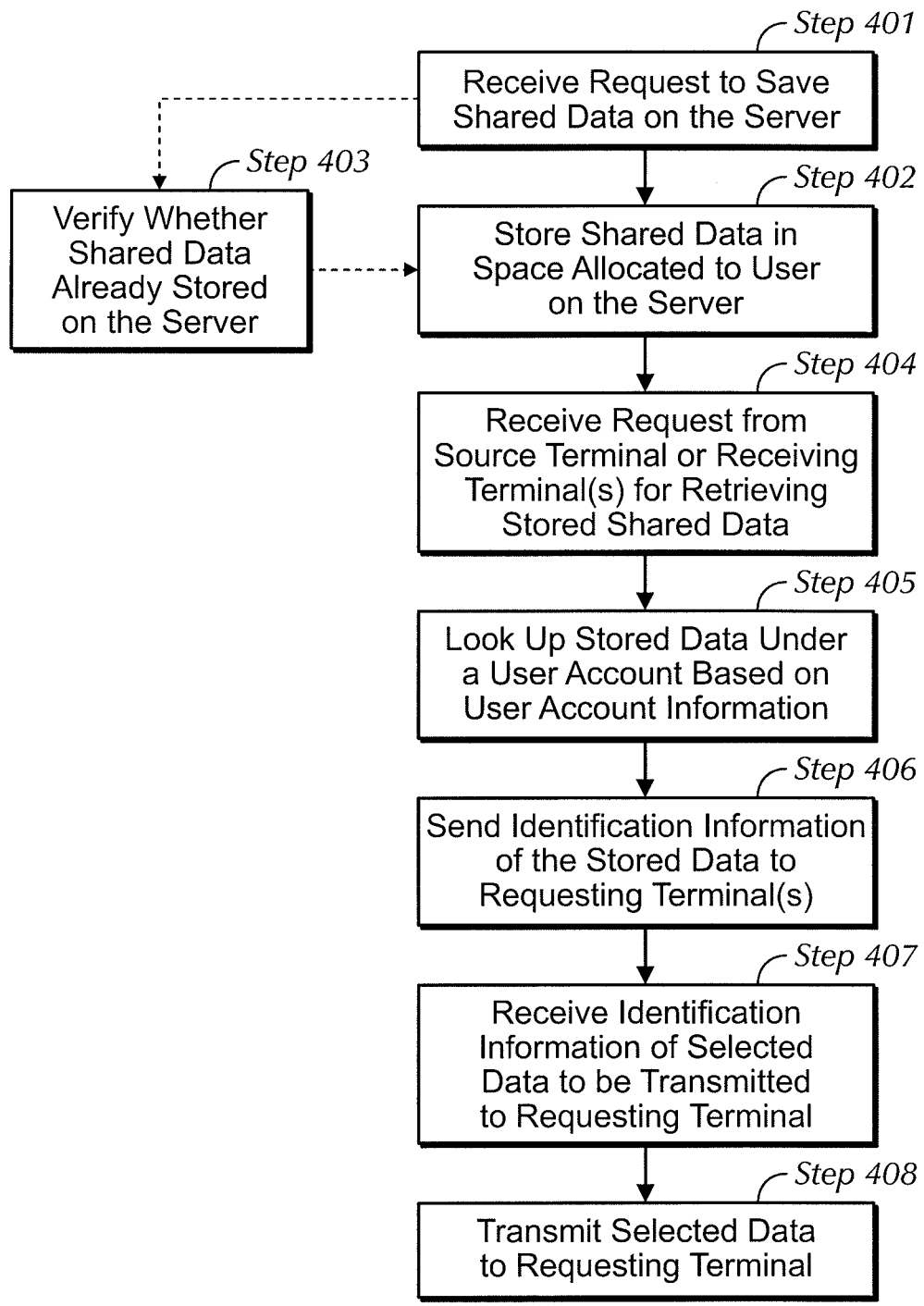
FIG. 4 is a flow chart illustrating the exemplary steps for storing the shared data as requested by a receiving terminal, according to embodiments of the disclosure.

If User B chooses not to receive the shared data on any of his devices right away, one of the other available options can be storing the data for later retrieval. FIG. 4 is a flow chart illustrating the exemplary steps in the process of storing the shared data per request by the intended recipient of the data (e.g., User B). For example, User B can request the data be stored on the server by selecting "Retrieve Later" from the alert menu (Step 401). In response to the request, the server can store the shared data in a memory space allocated to User B (Step 402). The server can determine the memory space allocated to User B based on User B's account information (e.g., account number or user name). This account information can be available in the initial data transmission from User A. For example, User B's account information may be included in the initial request as the intended recipient's account/address. Additionally or alternatively, the account information can be obtained from User B's request to store the shared data. That is, User B's request can also include information identifying his own account. Based on this account information, the shared data can be saved on the server in the memory space assigned to User B. This can allow User B to retrieve the stored data from the server based on his account information at a later time, as he chooses to.

Optionally, before the server stores the shared data, it can verify whether a copy of shared data already exists on the server (Step 403). This can be accomplished by, for example, first identifying identification information, such as file name, type, timestamp, sender, and intended recipient, associated with the shared data. Next, the server can verify, based on the identified identification information, whether the data already exists in its storage space. This can be done by, for example, determining whether the same identification information exists in a database containing an index of data for each user. If no matching data exists in the database, the server can store the shared data in User B's My Documents folder linked to his user account (Step 402). If the same data already exists on the server, the server can prompt User B whether to overwrite the preexisting copy with the newly-received copy or simply cancel the request for storing the new data. This optional step 403 can enable the server to more effectively utilize its available storage space and operate in a more efficient way by eliminating or reducing duplicate copies of the same data.

After the shared data is stored on the server per request by the recipient (e.g., User B), both the sender (e.g., User A) and the recipient (e.g., User B) can retrieve the data using account information of their respective messaging application accounts (Step 404). More specifically, the sender's request can be made from any of his devices including the source terminal. The recipient's request can be made from any one of the selected or available receiving terminals. In one embodiment, the request for retrieving the data can include the requester's user account information. Based on the user account information, the server can look up all data and the corresponding identification information in the user's storage space (Step 405). In one embodiment, the server can identify one or more virtual folders in the user's "My Document" storage space using the user account information and extract the identification information of each of the file stored in these folders. In this embodiment, the identification information can include, for example, the theme of the folder, type of data stored in the folder, and other folder specific information.

The extracted identification information of the stored data can then be sent to the requesting terminal so that the user can specifically identify by the identification information which data to be retrieved from the server (Step 406). The identification information of the share data can be transmitted to the requesting terminal in any suitable format, such as a list or a table. After the requesting terminal receives the list or table of identification information from the server, the requesting terminal can display the identification information for user to select which shared data to be downloaded from the server. After receiving user inputs selecting the data to be downloaded, the requesting terminal can send a request to the server to obtain only the selected data.

Next, the server can receive from the requesting terminal the corresponding identification information of the selected data (Step 407). In response, the server can identify the selected data based on the identification information and transmit the identified data to the requesting terminal (Step 408). If the requesting terminal is the source terminal of the requested data, the data can be transmitted back to the source terminal. If the requesting terminal is one or more of the receiving terminals, the requested data can be transmitted to the receiving terminal(s).

In one embodiment, the user account information and the identification information of the requested data can be sent to the server in the same request (e.g., Steps 404 and 407 in FIG. 4 can be combined) if the requesting terminal can maintain a duplicate list of all the data stored on the server for the particular user and the corresponding identification information.

Figure 5A:
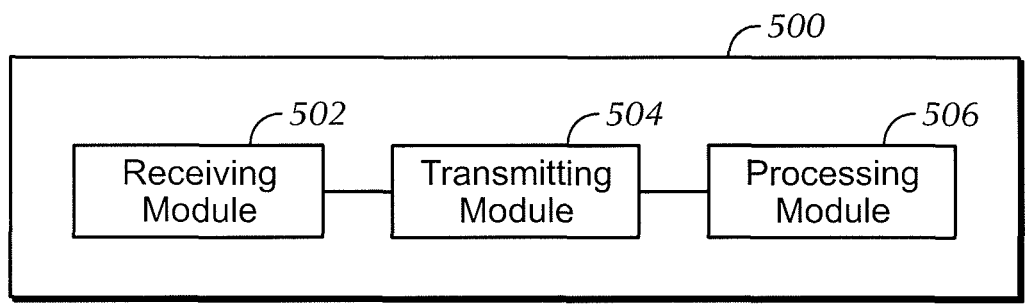
FIG. 5a illustrates exemplary modules on a server for transmitting, receiving, and processing data, according to embodiments of the disclosure.
Figure 5B:
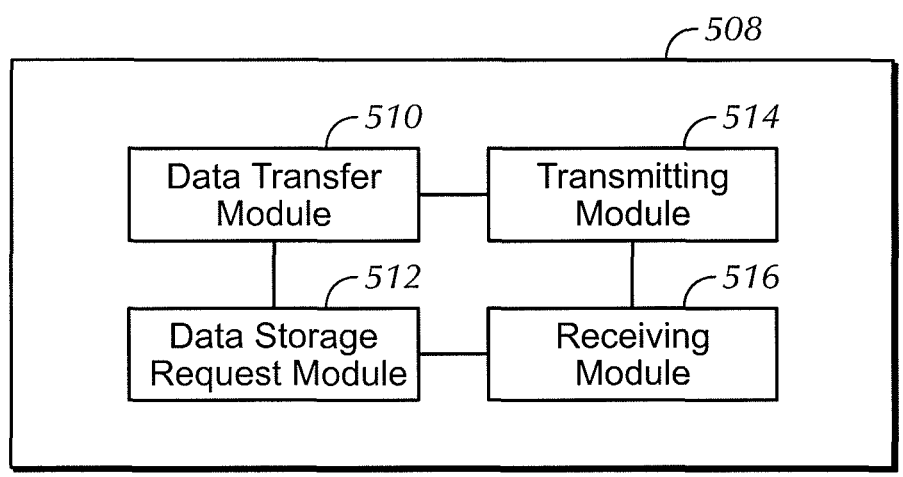
FIG. 5b illustrates exemplary modules of a terminal for facilitating communication and data transfer with other terminals, according to embodiments of the disclosure.

The communication between the source terminal, receiving terminal, and the server can be implemented using various combinations of software, firmware, and hardware technologies. Each of these systems may include one or more modules for facilitating various tasks in the data sharing process disclosed above. FIGS. 5a and 5b illustrate exemplary modules in an exemplary server and exemplary terminal, respectively. In some embodiments, these modules can be implemented mostly in software.

FIG. 5a illustrates exemplary modules on a server 500. As illustrated, the server 204 can include, for example, a receiving module 502, a transmitting module 504, and a processing module 506. Each of the three modules can be in communication with one or more of the other modules. The receiving module 502 can receive data shared by one or more source terminals connected to the server using user account information obtained from these terminals. The transmitting module 504 can transmit alerts to one or more receiving terminals in response to the receiving module 502 receiving data to be shared with the receiving terminals. The processing module 504, when requested, can store shared data on the server based on account information associated with the data and/or user. In addition, the processing module 504 can also transmit the stored data to one or more of the receiving terminals in response to the receiving module 502 receiving a request for delivery of the stored data to a terminal.

FIG. 5b illustrates exemplary modules on a terminal 508. The terminal 508 can be either a source terminal or a receiving terminal or both. In the latter case, the terminal 508 can both transmit data to be shared with other terminals and receive data shared by other terminals. As illustrated, the terminal 508 can include a data transfer module 510, a data storage request module 512, a transmitting module 514, and a receiving module 516. The data transfer module 510 can transmit outbound data to a server to be shared with at least one other terminal via a messaging application as discussed above. The data storage request module 512 can request the server to store inbound data shared by another device. The transmitting module 514 can request the delivery of data stored on the server using user account information. The transmitting module can also select and transmit to the server identification information of the data to be downloaded from the server. The receiving module 516 can receive identification information of all data available on the server associated with a particular user account. The receiving module 516 can also receive the actual shared data identified by selected identification information. Each of the four modules can be in communication with one or more of the other modules.

In some embodiments, one or more of these modules on the server and the terminal can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 6:
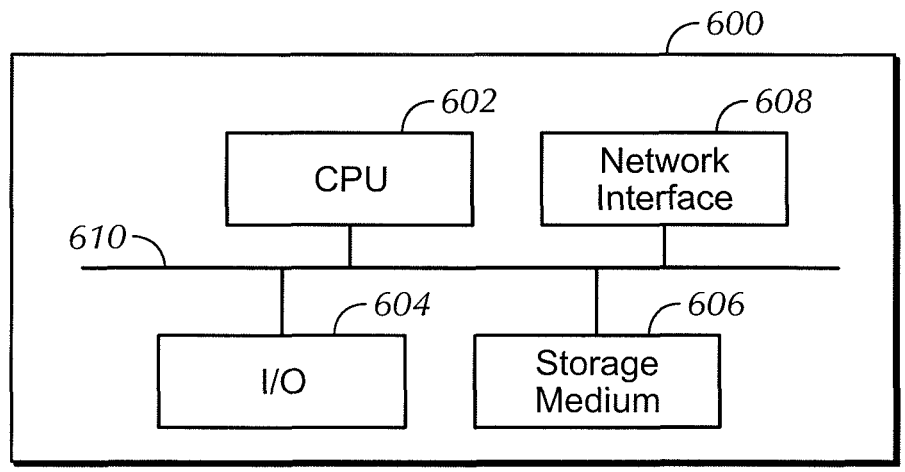
FIG. 6 illustrates exemplary components of a computing system such as a server or terminals described in the embodiments of the disclosure.

The non-transitory computer readable storage medium can be part of a computing system serving as the server or the terminals. FIG. 6 illustrates exemplary common components of one such computing system. As illustrated, the system 600 can include a central processing unit (CPU) 602, I/O components 604 including, but not limited to one or more of display, keypad, touch screen, speaker, and microphone, storage medium 606 such as the ones listed in the last paragraph, and network interface 608, all of which can be connected to each other via a system bus 610. The storage medium 606 can include the modules of FIGS. 5a and 5b depending on whether the system is a server or a terminal.

In the various embodiments, the present disclosure allows the user to log onto any of the one or more of his devices using his account information to share his data on one or more of his other devices or other users' devices. Furthermore, a user can select which device to receive data shared by from another device. This can allow multiple devices to have access to the same data without significantly changing the structure of the underlying messaging application or the communication network connecting the server and the terminals.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A method of sharing data among multiple devices, the multiple devices comprising a server, a source terminal, and multiple receiving terminals, the method comprising:
   receiving, on the server, account information associated with the multiple receiving terminals,
   receiving, on the server, data from the source terminal to be shared with at least one of the multiple receiving terminals,
   determining, based on the account information, at least one active receiving terminal,
   alerting the at least one active receiving terminal about the data shared by the source terminal,
   transmitting information identifying one or more of the multiple receiving terminals to the at least one active receiving terminal, wherein the information comprises a list of active receiving terminals sharing the account information,
   receiving a response from the at least one active receiving terminal, the response comprising a selection of one or more of the active receiving terminals by a user of the at least one active receiving terminal to receive the data, wherein the user-selected receiving terminal is distinct from the at least one active receiving terminal; and
   transmitting the data to the user-selected receiving terminal.

2. The method of claim 1, wherein the response comprises accepting the data on the at least one active receiving terminal.

3. The method of claim 1, wherein the multiple receiving terminals include devices through which the user has logged into his account at the server using the account information.

4. The method of claim 1, comprising receiving a request to store the data on the server.

5. The method of claim 4, comprising storing the data on the server based on the account information.

6. The method of claim 5, comprising:
   receiving, from one of the source terminal or receiving terminals, a request to retrieve stored data from the server based on a user account,
   identifying all data and corresponding identification information associated with the user account,
   transmitting the identification information to the requesting terminal;
   receiving a selection of the identification information from the requesting terminal,
   transmitting data identified by the identification information to the requesting terminal.

7. The method of claim 6, comprising:
   checking whether the data is already stored on the server, and if the data is already existed on the server,
   prompting the user whether to overwrite the existing data or cancel the request for storing the data from the source terminal.

8. The method of claim 1, wherein the response comprises rejecting the data.

9. The method of claim 1, wherein determining the active terminals comprises:
   determining one or more of the receiving terminals on which the account information indicating an online status,
   wherein the one or more receiving terminals are identified by their respective IP address or associated telephone number.

10. The method of claim 1, wherein determining the active terminals comprises determining one or more of the receiving terminals to which the account information has ever been associated.

11. The method of claim 1, wherein the account information is also associated with the source terminal.

12. The method of claim 1, comprising, limiting the availability of the data to a certain period of time or based on a geographic location of at least one of the receiving devices.

13. The method of claim 1, wherein the account information is associated with a messaging application or comprises a recipient's address.

14. A non-transitory computer-readable storage medium of a server connected to a source terminal and multiple receiving terminals, the storage medium storing instructions, when executed by a processor, performing the steps of:
   receiving account information associated with the multiple receiving terminals,
   receiving, data from the source terminal to be shared with at least one of the multiple receiving terminals,
   determining, based on the account information, at least one active receiving terminal,
   alerting the at least one active receiving terminal about the data shared by the source terminal,
   transmitting information identifying one or more of the multiple receiving terminals to the at least one active receiving terminal, wherein the information comprises a list of active receiving terminals sharing the account information,
   receiving a response from the at least one active receiving terminals, the response comprising a selection of one or more of the active receiving terminals by a user of the at least one active receiving terminal to receive the data, wherein the user-selected receiving terminal is distinct from the at least one active receiving terminal; and
   transmitting the data to the user-selected receiving terminal.

15. A server in communication with a source terminal and multiple receiving terminals, the server configured to facilitate data sharing between the source terminal and at least one of the multiple receiving terminals, the server comprising:
   a receiving module that receives user account information associated with the multiple receiving terminals and data to be shared by the source terminal using the user account information obtained from the source terminal,
   a transmitting module that transmits an alert to the at least one of the multiple receiving terminals in response to the receiving module receiving the shared data, and
   a processing module that stores the shared data based on the user account information in response to a request from the receiving terminal and transmits the shared data to another one of the multiple receiving terminals in response to a second request from the receiving terminal identifying the another one of the multiple receiving terminals, wherein the another one of the multiple receiving terminals is selected by a user of the receiving terminal from a list of active receiving terminals sharing the user account information, wherein the receiving terminal is distinct from the another one of the multiple receiving terminals identified in the second request.

16. The server of claim 15, wherein the processing module transmits the stored data to the at least one receiving terminal in response to the receiving module receiving a request for delivery of the stored data from the receiving terminal.

17. A terminal connected to a server, a source terminal and at least one other receiving terminal over a network, wherein the terminal and the at least one other receiving terminal share same user account information, the terminal comprising:
- a data transfer module that transmits outbound data to the server to be shared with the at least one receiving other terminal,
- a data storage request module that requests the server to store inbound data shared by the source terminal,
- a transmitting module that requests a delivery of data shared by the source terminal and stored on the server to the at least one other receiving terminal selected by a user of the terminal from a list of active receiving terminals sharing the user account information, and
- a receiving module that receives identification information of all data available on the server and associated with the user account information,
- wherein each of the data transfer module, data storage request module, transmitting module, and receiving module is in communication with one or more of the other modules.

18. The terminal of claim 17, wherein the transmitting module selects identification information of the data to be downloaded from the server and transmit the selected identification information to the server.

19. The terminal of claim 17, wherein the receiving module receives shared data identified by the selected identification information.

* * * * *